(12) United States Patent
Matsuura et al.

(10) Patent No.: US 12,405,679 B2
(45) Date of Patent: *Sep. 2, 2025

(54) POSITION DETECTION SENSOR AND POSITION DETECTION DEVICE

(71) Applicant: Wacom Co., Ltd., Saitama (JP)

(72) Inventors: Hikaru Matsuura, Saitama (JP);
Takeru Izumisawa, Saitama (JP);
Masamitsu Ito, Saitama (JP)

(73) Assignee: Wacom, Co., Ltd., Saitama (JP)

( * ) Notice: Subject to any disclaimer, the term of this patent is extended or adjusted under 35 U.S.C. 154(b) by 252 days.

This patent is subject to a terminal disclaimer.

(21) Appl. No.: 18/341,169

(22) Filed: Jun. 26, 2023

(65) Prior Publication Data
US 2023/0332930 A1    Oct. 19, 2023

Related U.S. Application Data

(63) Continuation of application No. 17/583,986, filed on Jan. 25, 2022, now Pat. No. 11,725,963.

(30) Foreign Application Priority Data

Mar. 15, 2021 (JP) .................... 2021-041535

(51) Int. Cl.
*G06F 3/0354* (2013.01)
*G05G 9/047* (2006.01)
*G06F 3/046* (2006.01)

(52) U.S. Cl.
CPC ......... *G06F 3/03545* (2013.01); *G05G 9/047* (2013.01); *G06F 3/046* (2013.01)

(58) Field of Classification Search
CPC .... G06F 3/03545; G06F 3/041; G06F 3/0412; G06F 3/0416; G06F 3/04162; G06F 3/046; G06F 3/047
See application file for complete search history.

(56) References Cited

U.S. PATENT DOCUMENTS 6,320,284 B1 *  11/2001  Fontana ................. G05G 9/047
                                                        345/161
6,445,311 B1 *   9/2002  Hohl ....................... G01D 5/202
                                                        341/20

(Continued)

FOREIGN PATENT DOCUMENTS

JP    H07295729 A    11/1995
JP    2002531902 A    9/2002
JP    2019-40249 A    3/2019

*Primary Examiner* — Steven L Yeninas
(74) *Attorney, Agent, or Firm* — Seed Intellectual Property Law Group LLP

(57) ABSTRACT

The present disclosure is directed to a position detection sensor of an electromagnetic induction type connected to a position detection circuitry. The position detection sensor includes a circular substrate, a plurality of first loop coils arranged in a first direction on the circular substrate, and a plurality of second loop coils arranged in a second direction on the circular substrate, the second direction intersecting the first direction. Each of the plurality of first loop coils includes a straight portion extending in the second direction and a circumferential portion disposed along an outer edge of the circular substrate, and each of the plurality of second loop coils includes a straight portion extending in the first direction and a circumferential portion disposed along the outer edge of the circular substrate.

16 Claims, 6 Drawing Sheets

(56) References Cited

U.S. PATENT DOCUMENTS

| | | |
|---|---|---|
| 10,936,093 B2 | 3/2021 | Kobori et al. |
| 2005/0083237 A1* | 4/2005 | Uen ........................ H01Q 7/00 |
| | | 343/742 |
| 2015/0061699 A1 | 3/2015 | Kim |
| 2019/0064944 A1* | 2/2019 | Kobori .................. G06F 3/0412 |
| 2020/0371625 A1* | 11/2020 | Katsurahira ........ G06F 3/04166 |

* cited by examiner

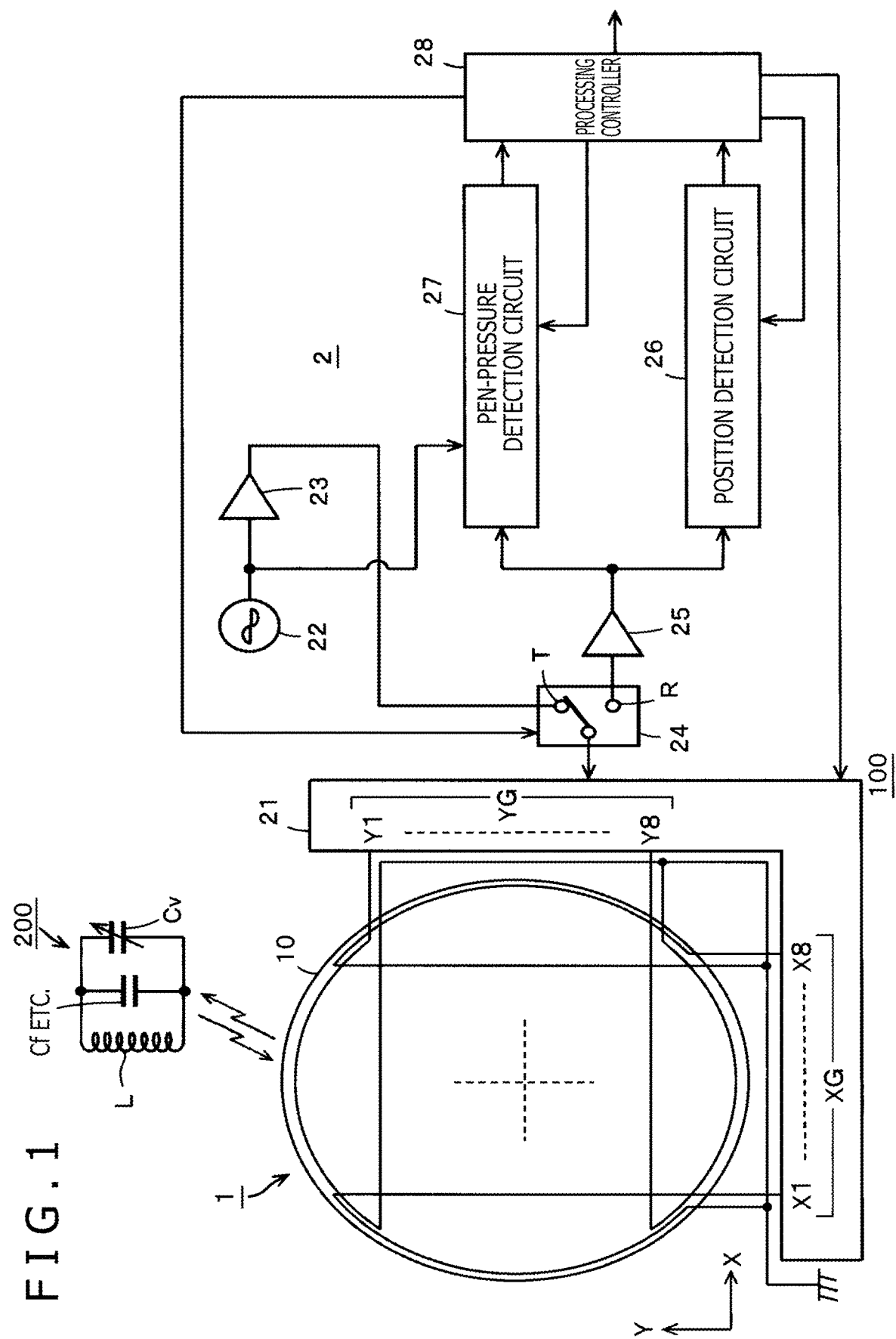

Xa Xb Xc Xd Xe Xf Xg Xh

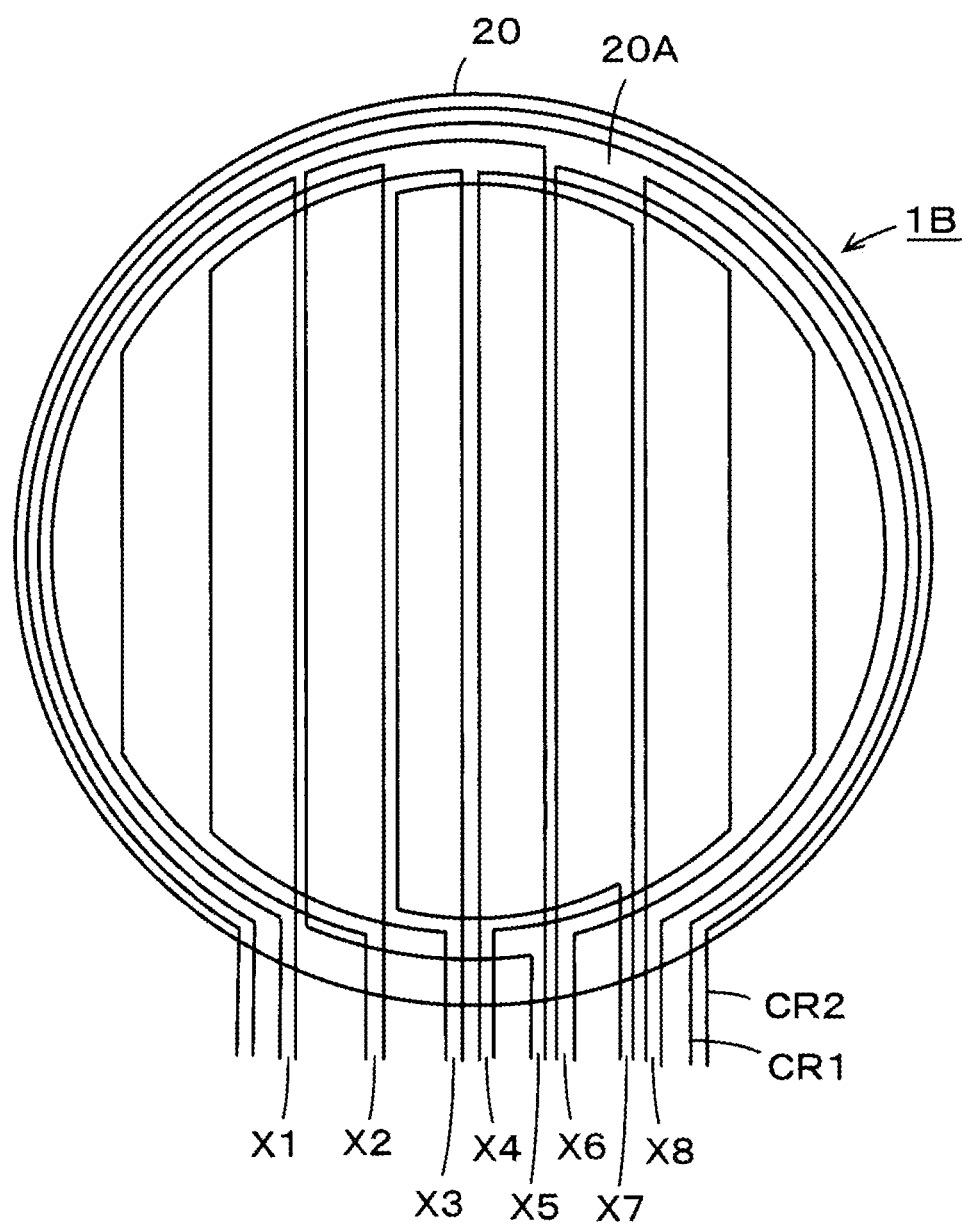

POSITION DETECTION SENSOR AND POSITION DETECTION DEVICE

BACKGROUND

Technical Field

The present disclosure relates to a position detection sensor that enables indication input by what is generally called an electronic pen (position indicator), and a position detection device including the position detection sensor.

Description of the Related Art

Japanese Patent Laid-Open No. 2019-40249 (hereinafter referred to as "Patent Document 1") discloses a position detection sensor and a position detection device that can properly detect a position indicated on a display screen even when the display screen has a curved portion on its outer edge. In the position detection sensor disclosed in Patent Document 1, in order to correspond to the shape of a display screen with four curved corners, for example, sensor electrodes to be positioned in the vicinity of the four corners are shaped so as to correspond to the shapes of these curved corners of the display screen. Accordingly, the position detection sensor implemented according to Patent Document 1 has a detection area having curved portions on its outer edge so as to match the shape of the display screen. In other words, the position detection sensor implemented according to Patent Document 1 has a detection area corresponding to the shape of the display screen having curved portions at its four corners.

In the future, there may be a demand for a position detection sensor that corresponds to the shape of a circular display screen. For the circular display screen, a rectangular position detection sensor may be used. In this case, the circumference of the display screen may serve as an inscribed circle of the rectangular position detection sensor, so that the indicated position can be detected regardless of which position is indicated on the circular display screen. However, the sensor area outside the inscribed circle is wasteful because it is not used for the position detection. For this reason, it is desirable to provide a circular position detection sensor that corresponds to the shape of the circular display screen.

Further, it is also possible to configure what is generally called a joystick by using a position detection sensor and an electronic pen, both of which are of an electromagnetic induction type. A joystick is an input device that allows a user to perform directional input by tilting a stick (lever). In this case, the electronic pen is used as the stick, and the position detection sensor detects the movement of the stick (the direction and angle of the tilt of the stick). In this way, a joystick that functions with high accuracy can be implemented with a simple configuration. In the case of the joystick, no matter how the stick is operated, the tip of the stick just moves within a predetermined circle. Therefore, the position detection sensor for the joystick is a circular position detection sensor with no wasteful sensor area.

BRIEF SUMMARY

Therefore, it is desirable to implement a circular position detection sensor of an electromagnetic induction type that functions with high accuracy and a position detection device including the circular position detection sensor.

In order to solve the problem described above, according to the present disclosure, there is provided a position detection sensor of an electromagnetic induction type connected to a position detection circuitry. The position detection sensor includes a circular substrate, a plurality of first loop coils arranged in a first direction on the circular substrate, and a plurality of second loop coils arranged in a second direction on the circular substrate. The second direction intersects the first direction. Each of the plurality of first loop coils includes a straight portion extending in the second direction and a circumferential portion disposed along an outer edge of the circular substrate, and each of the plurality of second loop coils includes a straight portion extending in the first direction and a circumferential portion disposed along the outer edge of the circular substrate.

A position detection sensor according to the present disclosure includes a plurality of first loop coils arranged in a first direction on a circular substrate and a plurality of second loop coils arranged in a second direction intersecting the first direction on the circular substrate. Each of the plurality of first loop coils includes a straight portion extending in the second direction and a circumferential portion disposed along an outer edge of the circular substrate. Further, each of the plurality of second loop coils includes a straight portion extending in the first direction and a circumferential portion disposed along the outer edge of the circular substrate. This configuration can implement a position detection sensor in which a circular sensor area is properly formed.

BRIEF DESCRIPTION OF THE SEVERAL VIEWS OF THE DRAWINGS

FIG. 1 is a diagram for describing an example of a configuration of a position detection device including a position detection sensor according to an embodiment;

FIG. 6 is a diagram for describing another example of the configuration of the position detection sensor according to the embodiment.

DETAILED DESCRIPTION

Figure 2A:
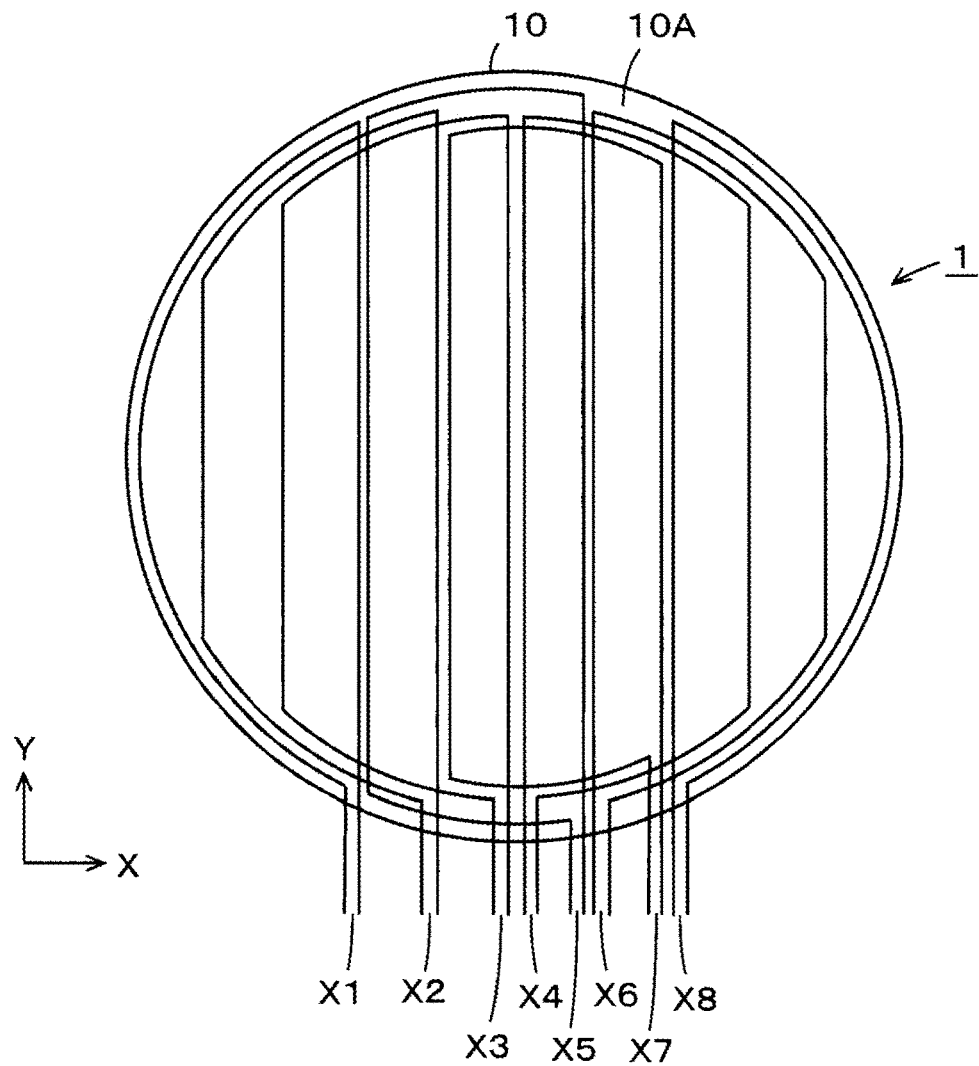
FIGS. 2A, 2B, and 2C are diagrams for describing an example of a configuration of the position detection sensor according to the embodiment.

Hereinafter, a position detection sensor and a position detection device according to the present disclosure will be described with reference to the drawings. The position detection sensor and the position detection device according to the embodiment to be described later are of an electromagnetic induction type. The position detection device of the electromagnetic induction type will be briefly described. The position detection device of the electromagnetic induction type includes a position detection sensor, which includes a plurality of loop coils arranged in each of an X-axis direction and a Y-axis direction, and a position detection circuitry. The position detection circuitry alternates between a transmission period and a reception period. In the transmission period, the position detection circuitry sequentially supplies power to the plurality of loop coils of the position detection sensor to generate magnetic fields. In the reception period, the position detection circuitry stops the power supply and sequentially receives magnetic fields from outside through the plurality of loop coils of the position detection sensor.

A corresponding electronic pen (position indicator) includes a resonant circuit including a coil and a capacitor. Current flowing through the coil according to a magnetic field from the position detection sensor generates a position indication signal, and this signal is transmitted to the position detection sensor. In the reception period, the position detection circuitry receives the position indication signal transmitted from the electronic pen through the position detection sensor and detects the position indicated on the position detection sensor. The position indication signal can also include pen-pressure information. If the pen-pressure information is included in the position indication signal, the position detection circuitry can also detect a pen pressure together with the indicated position.

In this way, the position detection device to be described later can transmit and receive signals (magnetic signals) to and from the corresponding electronic pen to supply power to the electronic pen and detect the position indicated by the electronic pen on the position detection sensor. In addition, the position detection sensor according to the embodiment to be described later is of the electromagnetic induction type and includes the plurality of loop coils as described above. For ease of description, the following description takes as an example a case where the number of loop coils arranged in the X-axis direction and the number of loop coils arranged in the Y-axis direction are eight each.

Example of Configuration of Position Detection Device

FIG. 1 is a diagram for describing an example of a configuration of a position detection device 100 which includes a position detection sensor 1 according to the embodiment. As illustrated in FIG. 1, the position detection device 100 includes the position detection sensor 1 and a position detection circuitry 2. A position indication operation is performed by an electronic pen 200 on the position detection sensor 1. As illustrated in the upper left of FIG. 1, the electronic pen 200 includes a resonant circuit in which a coil L for transmitting and receiving signals, a pen-pressure detector Cv, which is, for example, a variable-capacitance capacitor, and a resonant capacitor Cf and the like, which are disposed on a circuit board mounted in the electronic pen 200, are connected to each other in parallel.

The position detection sensor 1 includes an X-axis direction loop coil group XG and a Y-axis direction loop coil group YG stacked on a circular substrate 10, as will be described in detail later. In one embodiment, the X-axis and the Y-axis are substantially perpendicular to each other. As illustrated in FIG. 1, a sensor area (position detection area) of the position detection sensor 1 has a circular shape (e.g., a true circle in the present embodiment).

The position detection circuitry 2 includes a selection circuit 21, an oscillator 22, a current driver 23, a switching connection circuit 24, a reception amplifier 25, a position detection circuit 26, a pen-pressure detection circuit 27, and a processing controller 28. The processing controller 28 is a microprocessor configured with a central processing unit (CPU), a read-only memory (ROM), a random-access memory (RAM), a non-volatile memory, and the like connected thereto. As described later, the processing controller 28 controls selection of loop coils in the selection circuit 21, switching performed by the switching connection circuit 24, and processing timings in the position detection circuit 26 and the pen-pressure detection circuit 27.

The X-axis direction loop coil group XG and the Y-axis direction loop coil group YG of the position detection sensor 1 are connected to the selection circuit 21. The selection circuit 21 sequentially selects one loop coil among the two loop coil groups XG and YG according to the control by the processing controller 28. The oscillator 22 generates an alternating current (AC) signal of a frequency f0. The oscillator 22 supplies the generated AC signal to the current driver 23 and the pen-pressure detection circuit 27. The current driver 23 converts the AC signal supplied from the oscillator 22 into current and supplies the current to a transmission-side terminal T of the switching connection circuit 24. According to the control by the processing controller 28, the switching connection circuit 24 switches a connection destination (the transmission-side terminal T, a reception-side terminal R) to which the loop coil selected by the selection circuit 21 is connected.

Specifically, the connection destination is switched to the transmission-side terminal T in the transmission period and to the reception-side terminal R in the reception period. As illustrated in FIG. 1, the transmission-side terminal T is connected to the current driver 23, while the reception-side terminal R is connected to the reception amplifier 25. Therefore, in the transmission period, current is supplied to the loop coil selected by the selection circuit 21. In response, a magnetic field is generated, and a magnetic signal is transmitted to the electronic pen 200. Accordingly, an induction voltage is generated in the coil L of the electronic pen 200 on the position detection sensor 1. In response, a magnetic field is generated around the coil L, and a magnetic signal is transmitted to the position detection sensor 1.

In the reception period, an induction voltage is generated in each of loop coils X1 to X8 of the X-axis direction loop coil group XG and each of loop coils Y1 to Y8 of the Y-axis direction loop coil group YG by the magnetic signal (radio wave) transmitted from the electronic pen 200. The induction voltage generated in the loop coil selected by the selection circuit 21 is supplied to the reception amplifier 25 via the selection circuit 21 and the switching connection circuit 24. The reception amplifier 25 amplifies the induction voltage supplied from the loop coil and supplies the amplified induction voltage to the position detection circuit 26 and the pen-pressure detection circuit 27.

The position detection circuit 26 detects the induction voltage generated in the loop coil, that is, the received signal, converts the detected output signal into a digital signal, and outputs the digital signal to the processing controller 28. The processing controller 28 calculates coordinate values of the position indicated by the electronic pen 200 in the X-axis direction and the Y-axis direction, based on the digital signals received from the position detection circuit 26, that is, levels of voltage values of the induction voltages generated in the individual loop coils.

The pen-pressure detection circuit 27 detects the output signal of the reception amplifier 25 in synchronization with the AC signal from the oscillator 22, to obtain a signal with a level corresponding to a phase difference (frequency shift) between these signals. The pen-pressure detection circuit 27 then converts the signal corresponding to the phase difference (frequency shift) into a digital signal and outputs the digital signal to the processing controller 28. The processing controller 28 detects a pen pressure applied to the electronic pen 200, based on the digital signal from the pen-pressure detection circuit 27, that is, the level of the signal corresponding to the phase difference (frequency shift) between the transmitted radio wave and the received radio wave.

The coordinate values of the position indicated on the position detection sensor 1 and the pen pressure applied to the electronic pen 200 that have been detected in the processing controller 28 are supplied to an information processing apparatus in which this position detection device is mounted, and are used for various processes. The position detection device 100 according to the present embodiment includes the circular position detection sensor 1 in this way, thereby functioning as an input device of the electromagnetic induction type together with a display device including a circular display screen, for example. Further, the electronic pen 200 and the position detection device 100 can implement a joystick of the electromagnetic induction type by making the electronic pen 200 operable as a stick (lever) of the joystick.

Each of the loop coils X1 to X8 and the loop coils Y1 to Y8, which constitute electrodes of the position detection sensor 1, may have one turn or two or more turns. Hereinafter, a configuration where each of the loop coils X1 to X8 and the loop coils Y1 to Y8 has one turn will be described in detail. After that, a configuration where each of the loop coils X1 to X8 and the loop coils Y1 to Y8 has two turns, as an example of multiple turns, will be described in detail.

Position Detection Sensor Including Loop Coils with One Turn

Figure 2B:
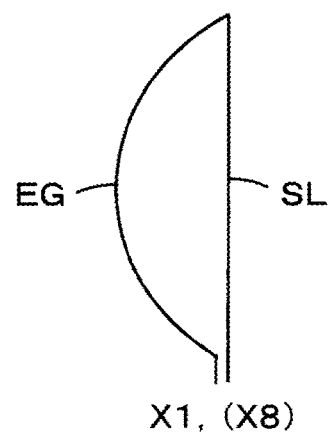
Figure 2C:
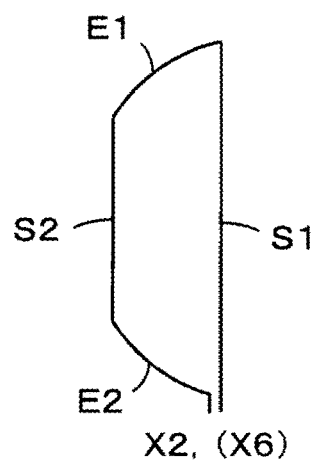
Figure 3:
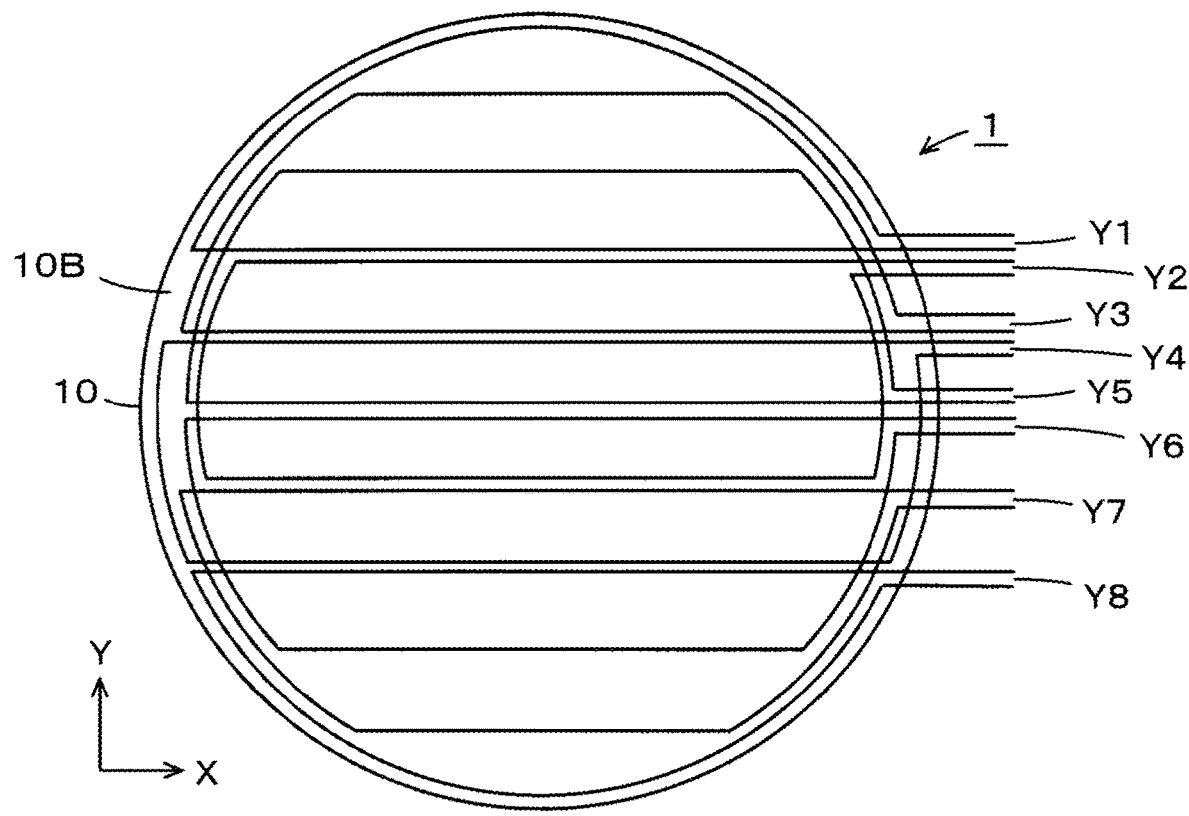
FIG. 3 is a diagram for describing an example of the configuration of the position detection sensor according to the embodiment.

FIGS. 2A to 3 are diagrams for describing an example of a configuration of the position detection sensor. In the example illustrated in FIGS. 2A to 3, the loop coils with one turn (wound once) constitute the position detection sensor 1. As illustrated in FIG. 2A, the eight loop coils X1 to X8 with one turn are arranged in the X-axis direction on a first surface (circular surface) 10A of the circular substrate 10, constituting the position detection area (sensor surface). Each of the loop coils X1 to X8 is configured so as not to protrude from the first surface 10A except for a portion routed to be connected to the position detection circuitry 2. Each of the loop coils X1 to X8 includes at least one straight portion extending in the direction (Y-axis direction) intersecting the X-axis direction and at least one circumferential portion disposed along an outer edge of the first surface 10A of the circular substrate 10. In one embodiment, the circumferential portion has an arc shape, and extends along the outer edge of the first surface 10A of the circular substrate 10 such that the circumferential portion has the same curvature of the outer edge and does not overlap the outer edge.

Specifically, as illustrated in FIG. 2B, the loop coil X1, which is disposed at a left end in the X-axis direction, includes a straight portion SL, which extends in the direction (Y-axis direction) intersecting the X-axis direction, and a circumferential portion EG, which is disposed along the outer edge of the first surface 10A of the circular substrate 10. As illustrated in FIG. 2B, the loop coil X1 has the straight portion SL on the right side and the circumferential portion EG on the left side. The loop coil X8, which is disposed at a right end in the X-axis direction, has the same shape as the loop coil X1. However, since the outer edge of the circular substrate 10 is on the right side of the loop coil X8, the loop coil X8 has the circumferential portion EG on the right side and the straight portion SL on the left side.

As illustrated in FIG. 2C, the loop coil X2, which is disposed on the right side of the loop coil X1, includes straight portions S1 and S2, which are opposed to each other and extend in the direction (Y-axis direction) intersecting the X-axis direction, and circumferential portions E1 and E2, which are opposed to each other and disposed along the outer edge of the first surface 10A of the circular substrate 10. The loop coil X6, which is disposed on the left side of the loop coil X8, has the same shape as the loop coil X2. However, the loop coil X6 has the straight portion S2 on the right side and the straight portion S1 on the left side.

In this way, each of the loop coils X2 to X7, other than the loop coils X1 and X8 respectively disposed at the left and right ends in the X-axis direction, includes the two straight portions that are opposed to each other and extend in the Y-axis direction and the two circumferential portions that are opposed to each other and disposed along the outer edge of the first surface 10A. Each of the circumferential portions connects an end of one of the two straight portions and an end of the other straight portion. Of the two straight portions, the length of the straight portion closer to the center of the circular substrate 10 is greater than the length of the straight portion far from the center. Accordingly, as illustrated in FIG. 2A, the straight portions can be arranged at substantially equal intervals in the X-axis direction on the first surface 10A of the circular substrate 10, and the circumferential portions EG can be arranged along the outer edge of the circular substrate 10 at the opposite ends in the X-axis direction.

As illustrated in FIG. 3, the eight loop coils Y1 to Y8 with one turn are arranged in the Y-axis direction on a second surface 10B (a circular surface on the opposite side (back side) of the first surface 10A) of the circular substrate 10, constituting the position detection area (sensor surface). In other words, the position detection sensor 1 according to the present embodiment includes the eight loop coils X1 to X8, which are arranged in a first direction (X-axis direction) on the first surface 10A, and the eight loop coils Y1 to Y8, which are arranged in a second direction (Y-axis direction) intersecting the first direction on the second surface 10B. Although the first direction and the second direction are perpendicular to each other in this example, the angle of the intersection between the first direction and the second direction can be any suitable angle.

The loop coils Y1 to Y8, which are arranged on the second surface 10B, are arranged in a way similar to that of the loop coils X1 to X8, which are arranged on the first surface 10A, except that the direction in which the loop coils Y1 to Y8 are arranged is the Y-axis direction. As illustrated in FIG. 3, each of the loop coils Y1 and Y8, which are respectively arranged at upper and lower ends in the Y-axis direction, includes a straight portion extending in the direction (X-axis direction) intersecting the Y-axis direction and a circumferential portion disposed along an outer edge of the second surface 10B of the circular substrate 10. Thus, an upper end portion of the loop coil Y1 serves as the circumferential portion along the outer edge of the second surface 10B, and a lower end portion of the loop coil Y1 serves as the straight portion. Conversely, a lower end portion of the loop coil Y8 serves as the circumferential portion along the outer edge of the second surface 10B, and an upper end portion of the loop coil Y8 serves as the straight portion.

Each of the loop coils Y2 to Y7, other than the loop coils Y1 and Y8 respectively arranged at the upper and lower ends in the Y-axis direction, includes two straight portions that are opposed to each other and extend in the X-axis direction and two circumferential portions that are opposed to each other and disposed along the outer edge of the second surface 10B. Each of the circumferential portions connects an end of one of the two straight portions and an end of the other straight portion. Of the two straight portions, the length of the straight portion closer to the center of the circular substrate 10 is greater than the length of the straight portion far from the center. As illustrated in FIG. 3, the straight portions can be arranged at substantially equal intervals in the Y-axis direction on the second surface 10B of the circular substrate 10, and the circumferential portions can be arranged along the outer edge of the circular substrate 10 at the opposite ends in the Y-axis direction.

In this way, the X-axis direction loop coils X1 to X8 are arranged on the first surface 10A of the circular substrate 10, and the Y-axis direction loop coils Y1 to Y8 are arranged on the second surface 10B of the circular substrate 10. In this way, the circular position detection sensor 1, which can pinpoint the indicated position, can be formed. In order to clearly illustrate the arrangement of the X-axis direction loop coil group XG and the arrangement of the Y-axis direction loop coil group YG, their respective routing portions (end portions) are routed in different directions by 90 degrees, as illustrated in FIGS. 2A and 3. In actual implementation, however, the routing portion of the X-axis direction loop coil group XG and the routing portion of the Y-axis direction loop coil group YG are formed in the same direction.

For example, consider a case where the routing portion of the Y-axis direction loop coil group YG is aligned with the routing portion of the X-axis direction loop coil group XG. In this case, for example, the loop coils Y1 to Y8 on the second surface 10B may be led to the first surface 10A through a through-hole provided in the vicinity of the center, and then routed toward the routing portion of the X-axis direction loop coil group XG in parallel with the X-axis direction loop coil group XG. This similarly applies to the case where the routing portion of the X-axis direction loop coil group XG is aligned with the routing portion of the Y-axis direction loop coil group YG. That is, for example, the loop coils X1 to X8 may be routed from the vicinity of the center of the first surface 10A toward the routing portion of the Y-axis direction loop coil group YG.

Needless to say, routing lines from the loop coils Y1 to Y8 may be routed around the circular substrate 10, or routing lines from the loop coils X1 to X8 may be routed around the circular substrate 10. In short, various methods can be employed to align the routing portion of the X-axis direction loop coil group XG with the routing portion of the Y-axis direction loop coil group YG.

Figure 4:
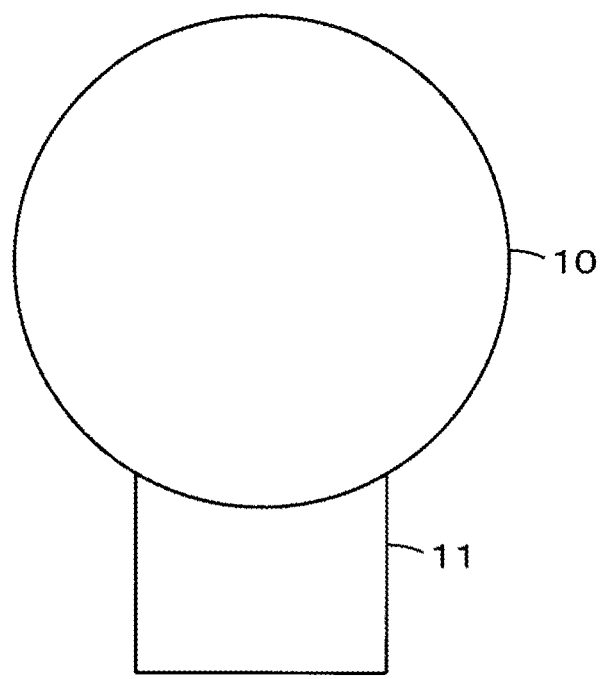
FIG. 4 is a diagram for describing an external shape of the position detection sensor according to the embodiment.

FIG. 4 is a diagram for describing an external shape of the position detection sensor 1 according to the embodiment. As illustrated in FIG. 4, an external appearance of the position detection sensor 1 includes a portion corresponding to the circular substrate 10 where the sensor area (position detection area) is formed and a routing portion 11 where the X-axis direction loop coil group XG and the Y-axis direction loop coil group YG, which are arranged on the circular substrate 10, are routed. In this way, the position detection sensor 1 according to the embodiment is a circular position detection sensor, and the routing portion 11 is a portion connected to the selection circuit 21 of the position detection circuitry 2. Accordingly, the circular position detection sensor 1, which includes the loop coils arranged as described with reference to FIGS. 2A to 3, is connected to the position detection circuitry 2, thereby constituting the position detection device 100 illustrated in FIG. 1.

Position Detection Sensor Including Loop Coils with Two Turns

Figure 5A:
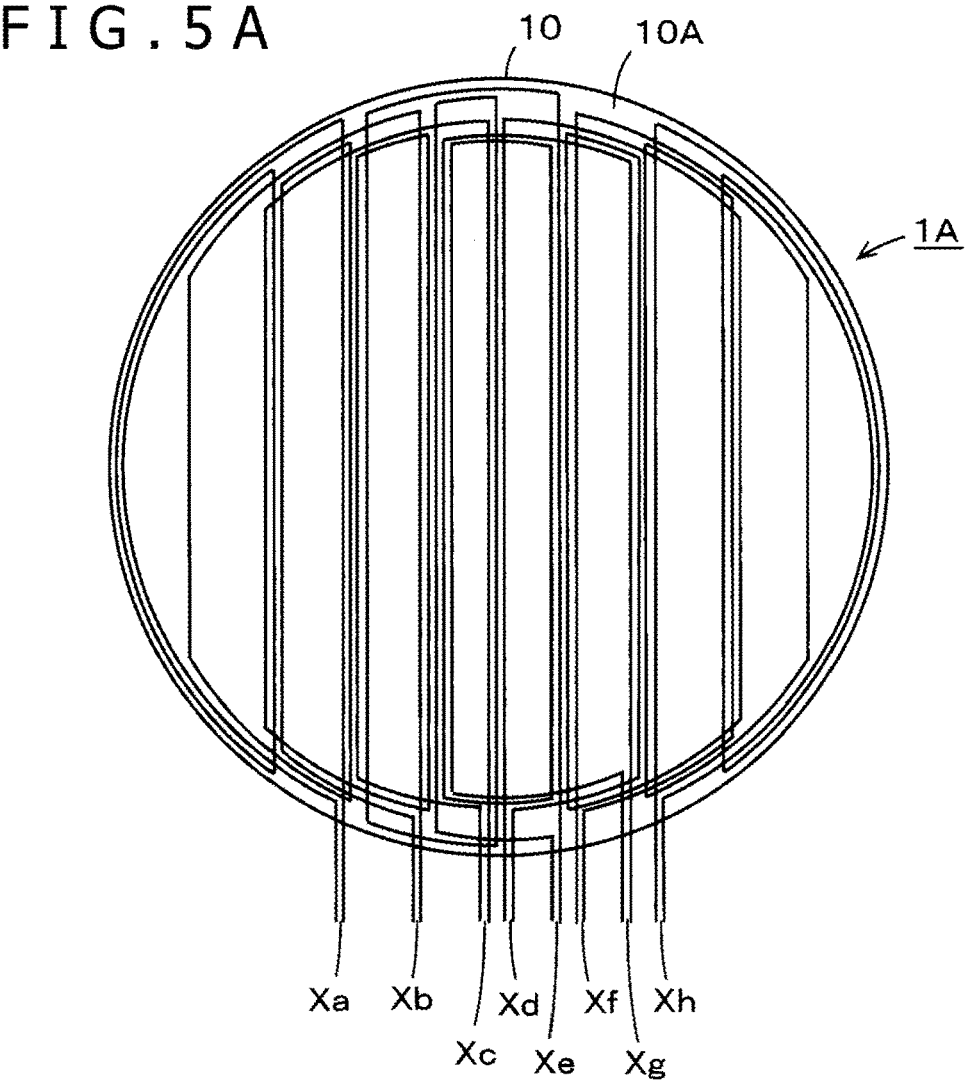
FIGS. 5A, 5B, and 5C are diagrams for describing another example of the configuration of the position detection sensor according to the embodiment.
Figure 5B:
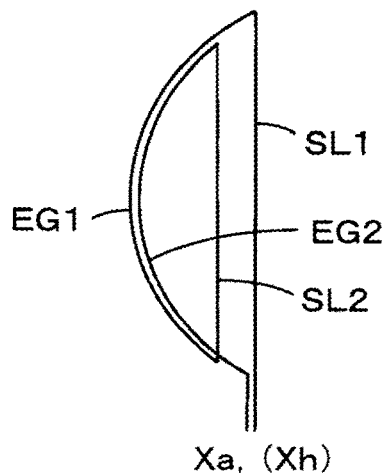
Figure 5C:
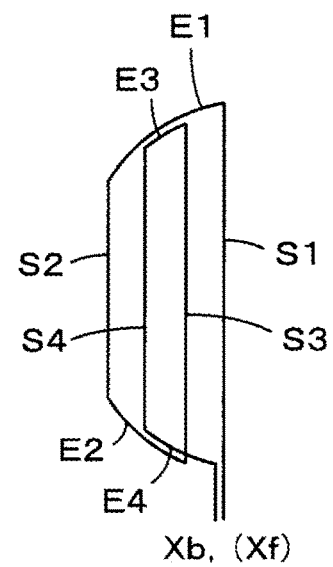

FIGS. 5A to 5C are diagrams for describing another example of the configuration of the position detection sensor. In the example illustrated in FIGS. 5A to 5C, loop coils with two turns (wound twice) constitute a position detection sensor 1A. The position detection sensor 1A according to this example can be used instead of the position detection sensor 1 illustrated in FIG. 1 and can constitute the position detection device 100 together with the position detection circuitry 2 illustrated in FIG. 1. As illustrated in FIG. 5A, the position detection sensor 1A according to this example also includes the circular substrate 10.

Eight loop coils Xa to Xh with two turns are arranged in the X-axis direction on the first surface (circular surface) 10A of the circular substrate 10, constituting the position detection area (sensor surface). Each of the loop coils Xa to Xh is configured so as not to protrude from the first surface 10A except for a portion routed to be connected to the position detection circuitry 2. Each of the loop coils Xa to Xh includes straight portions each extending in the direction (Y-axis direction) intersecting the X-axis direction and circumferential portions each disposed along the outer edge of the first surface 10A of the circular substrate 10, as with the position detection sensor 1 described with reference to FIGS. 2A to 3.

Specifically, as illustrated in FIG. 5B, the loop coil Xa, which is disposed at the left end in the X-axis direction, includes straight portions SL1 and SL2, which extend in the direction (Y-axis direction) intersecting the X-axis direction, and circumferential portions EG1 and EG2, which are disposed along the outer edge of the first surface 10A of the circular substrate 10. As illustrated in FIG. 5B, the straight portion SL1 and the circumferential portion EG1 constitute the first turn of the loop coil Xa, and the straight portion SL2 and the circumferential portion EG2 constitute the second turn of the loop coil Xa. In this case, the components of the loop coil Xa are aligned in the order of the straight portion SL1, the straight portion SL2, the circumferential portion EG2, and the circumferential portion EG1 from the right side (from the center side of the circular substrate 10).

The loop coil Xh, which is disposed at the right end in the X-axis direction, has the same shape as the loop coil Xa. However, since the outer edge of the circular substrate 10 is on the right side of the loop coil Xh, the loop coil Xh has the circumferential portions EG1 and EG2 on the right side and the straight portions SL1 and SL2 on the left side. As with the loop coil Xa, the straight portion SL1 and the circumferential portion EG1 constitute the first turn of the loop coil Xh, and the straight portion SL2 and the circumferential portion EG2 constitute the second turn of the loop coil Xh. In this case, contrary to the loop coil Xa, the components of the loop coil Xh are aligned in the order of the straight portion SL1, the straight portion SL2, the circumferential portion EG2, and the circumferential portion EG1 from the left side (from the center side of the circular substrate 10).

As illustrated in FIG. 5C, the loop coil Xb, which is disposed on the right side of the loop coil Xa, includes straight portions S1, S2, S3, and S4, which are opposed to each other and extend in the direction (Y-axis direction) intersecting the X-axis direction, and circumferential portions E1, E2, E3, and E4, which are opposed to each other and disposed along the outer edge of the first surface 10A of the circular substrate 10. In this case, the straight portion S1, the circumferential portion E1, the straight portion S2, and the circumferential portion E2 constitute the first turn of the loop coil Xb, and the straight portion S3, the circumferential portion E3, the straight portion S4, and the circumferential portion E4 constitute the second turn of the loop coil Xb.

Accordingly, the straight portions of the loop coil Xb are aligned in the order of the straight portion S1, the straight portion S3, the straight portion S4, and the straight portion S2 from the right side (from the center side of the circular substrate 10). Further, the circumferential portion E1, which connects the straight portion S1 and the straight portion S2, and the circumferential portion E3, which connects the straight portion S3 and the straight portion S4, are aligned on the upper side of FIG. 5C. Further, the circumferential portion E2, which connects the straight portion S2 and the straight portion S3, and the circumferential portion E4, which returns from the straight portion S4 to the routing portion, are aligned on the lower side of FIG. 5C.

The loop coil Xf, which is disposed on the left side of the loop coil Xh, has the same shape as the loop coil Xb. However, the alignment of the straight portions of the loop coil Xf is opposite to the alignment of the straight portions of the loop coil Xb. That is, the straight portions of the loop coil Xf are aligned in the order of the straight portion S1, the straight portion S3, the straight portion S4, and the straight portion S2 from the left side (from the center side of the circular substrate 10). Further, the circumferential portion E1, which connects the straight portion S1 and the straight portion S2, and the circumferential portion E3, which connects the straight portion S3 and the straight portion S4, are aligned on the upper side of FIG. 5C. Further, the circumferential portion E2, which connects the straight portion S2 and the straight portion S3, and the circumferential portion E4, which returns from the straight portion S4 to the routing portion, are aligned on the lower side of FIG. 5C.

In this way, each of the loop coils Xb to Xg, other than the loop coils Xa and Xh respectively arranged at the left and right ends in the X-axis direction, includes the four straight portions that are opposed to each other and extend in the Y-axis direction and the four circumferential portions that are opposed to each other and disposed along the outer edge of the first surface 10A. Each of the circumferential portions connects an end of a corresponding one of the four straight portions and an end of another corresponding one of the four straight portions. Of the four straight portions, the lengths of the straight portions closer to the center of the circular substrate 10 are greater than the lengths of the straight portions far from the center. As illustrated in FIG. 5A, the straight portions can be arranged at substantially equal intervals on the first surface 10A of the circular substrate 10, and the circumferential portions can be arranged along the outer edge of the circular substrate 10 at the opposite ends in the X-axis direction.

Similar to FIG. 3, eight loop coils Ya to Yh with two turns are arranged in the Y-axis direction on the second surface 10B (the circular surface on the opposite side (back side) of the first surface 10A) of the circular substrate 10, constituting the position detection area (sensor surface). In the position detection sensor 1A according to this example, the eight loop coils Xa to Xh with two turns are arranged in the first direction (X-axis direction) on the first surface 10A, and the eight loop coils Ya to Yh with two turns are arranged in the second direction (Y-axis direction) intersecting the first direction on the second surface 10B. In other words, the loop coils Xa to Xh, which are arranged on the first surface 10A, are turned by 90 degrees and arranged on the second surface 10B, so that the position detection sensor 1A can be configured. Although the first direction and the second direction are perpendicular to each other in this example, the angle of the intersection between the first direction and the second direction can be any suitable angle.

In this way, the X-axis direction loop coils Xa to Xh are arranged on the first surface 10A of the circular substrate 10, and the Y-axis direction loop coils Ya to Yh are arranged on the second surface 10B of the circular substrate 10. In this way, the circular position detection sensor 1A, which can pinpoint the indicated position, can be formed. In the position detection sensor 1A according to this example as well, the routing portion of the X-axis direction loop coils Xa to Xh and the routing portion of the Y-axis direction loop coils Ya to Yh are formed in the same direction.

Accordingly, as illustrated in FIG. 4, the position detection sensor 1A according to this example also includes the portion corresponding to the circular substrate 10 where the sensor area (position detection area) is formed and the routing portion 11 where the X-axis direction loop coil group XG and the Y-axis direction loop coil group YG, which are arranged on the circular substrate 10, are routed. Accordingly, the circular position detection sensor 1A, which includes the loop coils arranged as described with reference to FIGS. 5A to 5C, is connected to the position detection circuitry 2, thereby constituting the position detection device 100.

While the loop coils with two turns are used to constitute the position detection sensor 1A in the example described above, loop coils with three or more turns can be used to constitute a position detection sensor with a configuration similar to that of the position detection sensor 1A. That is, it suffices that such a position detection sensor include loop coils each including straight portions extending in the direction intersecting the arrangement direction and circumferential portions disposed along the outer edge of the circular substrate. In more detail, the straight portions are arranged at predetermined intervals in the arrangement direction. For example, the straight portions are equally spaced from each other. The circumferential portions are arranged so as to be close and immediately adjacent to each other. The position detection sensor configured in this way can suitably detect the indicated position on the substantially entire surface of the circular substrate 10.

Use of Peripheral Electrodes

FIG. 6 is a diagram for describing another example of the configuration of the position detection sensor according to the embodiment. As with the position detection sensor 1 described with reference to FIGS. 2A to 3, a position detection sensor 1B according to this example includes the loop coils X1 to X8 and the loop coils Y1 to Y8, which are respectively arranged on a first surface 20A and a second surface 20B, opposite to the first surface 20A, of a circular substrate 20. Additionally, as illustrated in FIG. 6, the position detection sensor 1B includes loop coils CR1 and CR2, which are arranged on the first surface 20A of the circular substrate 20 along an outer edge of the first surface 20A.

The loop coils CR1 and CR2 are used for transmitting and receiving magnetic signals in a way similar to that of the other loop coils X1 to X8 and Y1 to Y8. When the loop coils CR1 and CR2 operate, the presence or absence of the corresponding electronic pen 200 can be determined in a wide area on the circular substrate 20. Accordingly, when the presence of the electronic pen 200 cannot be detected through the loop coils CR1 and CR2, the processing controller 28 can control, for example, one or more units of the position detection device 100 so as to suspend the detection of the indicated position using the loop coils X1 to X8 and Y1 to Y8. Further, when the presence of the corresponding electronic pen 200 is detected on the circular substrate 20 through the loop coils CR1 and CR2, the processing controller 28 can control, for example, one or more units of the position detection device 100 so as to detect the indicated position using the loop coils X1 to X8 and Y1 to Y8. By employing the position detection sensor 1B, therefore, it is possible to implement a position detection device with a power-saving mode that functions in response to the electronic pen 200 being present on the circular substrate 20.

More specifically, the position detection device 100 illustrated in FIG. 1 uses the position detection sensor 1B described with reference to FIG. 6 instead of the position detection sensor 1. In this case, in addition to the X-axis direction loop coils X1 to X8 and the Y-axis direction loop coils Y1 to Y8, the loop coils CR1 and CR2 are also connected to the selection circuit 21. In the transmission period, the processing controller 28 switches the connection destination of the switching connection circuit 24 to the transmission-side terminal T and selects both of the loop coils CR1 and CR2 or sequentially selects them to transmit magnetic signals from the loop coils CR1 and CR2. Next, in the reception period, the processing controller 28 switches the connection destination of the switching connection circuit 24 to the reception-side terminal R and selects both of the loop coils CR1 and CR2 or sequentially selects them. Accordingly, magnetic signals can be received through the loop coils CR1 and CR2, and the position indicated by the electronic pen 200 on the position detection area of the position detection sensor 1B can be detected through the position detection circuit 26.

The processing controller 28 determines whether or not the electronic pen 200 is present on the position detection area of the position detection sensor 1B, based on the detection output from the position detection circuit 26. Assume that the processing controller 28 has confirmed the presence of the electronic pen 200. In this case, in the transmission period, the processing controller 28 switches the connection destination of the switching connection circuit 24 to the transmission-side terminal T, and transmits magnetic signals by sequentially switching the X-axis direction loop coils X1 to X8 and the Y-axis direction loop coils Y1 to Y8 in addition to the loop coils CR1 and CR2. In the reception period, the processing controller 28 switches the connection destination of the switching connection circuit 24 to the reception-side terminal R and sequentially switches the X-axis direction loop coils X1 to X8 and the Y-axis direction loop coils Y1 to Y8 in addition to the loop coils CR1 and CR2. Accordingly, the magnetic signals are received, and the indicated position and pen pressure of the electronic pen 200 are detected through the position detection circuit 26 and the pen-pressure detection circuit 27.

When the processing controller 28 cannot confirm the presence of the electronic pen 200, transmission and reception of magnetic signals are performed using the loop coils CR1 and CR2, and the processing controller 28 waits for the presence of the electronic pen 200 to be confirmed. Assume that, after the processing controller 28 confirms the presence of the electronic pen 200, the processing controller 28 can no longer confirm the presence of the electronic pen 200 through the loop coils CR1 and CR2. In this case, the processing controller 28 stops using the X-axis direction loop coils X1 to X8 and the Y-axis direction loop coils Y1 to Y8. This realizes the power saving of the position detection device 100.

The loop coils CR1 and CR2 may be used exclusively for power transmission of magnetic signals, so that power can be efficiently supplied to the electronic pen 200. Alternatively, the loop coils CR1 and CR2 may be used exclusively for transmitting magnetic signals (for power supply), and the loop coils X1 to X8 and Y1 to Y8 may be used exclusively for receiving magnetic signals (for the detection of the indicated position). Additionally, loop coils CR3 and CR4 may be arranged on the second surface 20B of the circular substrate 20 along an outer edge of the second surface 20B in a way similar to that of the loop coils CR1 and CR2. With this configuration, power can be supplied to the electronic pen 200 more efficiently, and the presence of the electronic pen 200 can be properly detected.

Here, consider a specific configuration in which the loop coils CR1 and CR2 are used for transmitting magnetic signals (for power supply) and the loop coils X1 to X8 and Y1 to Y8 are used for receiving magnetic signals (for the detection of the indicated position). Basically, the position detection device 100 illustrated in FIG. 1 uses the position detection sensor 1B described with reference to FIG. 6, instead of the position detection sensor 1. In this case, in addition to the X-axis direction loop coils X1 to X8 and the Y-axis direction loop coils Y1 to Y8, the loop coils CR1 and CR2 are also connected to the selection circuit 21.

In this case, in the transmission period, the processing controller 28 selects both of the loop coils CR1 and CR2 or sequentially selects them. Then, the processing controller 28 switches the connection destination of the switching connection circuit 24 to the transmission-side terminal T and causes magnetic signals to be transmitted from the loop coils CR1 and CR2. In the reception period, the processing controller 28 sequentially switches the X-axis direction loop coils X1 to X8 and the Y-axis direction loop coils Y1 to Y8 without selecting the loop coils CR1 and CR2. In response, magnetic signals are received, and the indicated position and pen pressure of the electronic pen 200 are detected through the position detection circuit 26 and the pen-pressure detection circuit 27.

While the position detection sensor 1B here has been described as using the loop coils with one turn, the embodiment is not limited thereto. Even when loop coils with two or more turns as described above are used, the loop coils CR1 and CR2 and the loop coils CR3 and CR4 as the peripheral electrodes can be arranged in a similar manner to configure and use a position detection sensor as described above. Needless to say, the loop coils CR1, CR2, CR3, and CR4 may be loop coils with multiple turns. Further, the number of loop coils CR1, CR2, . . . arranged along the outer edge of the circular substrate can also be any suitable number.

Method for Identifying Position Indicated on Position Detection Sensor

The position detection sensor 1 and the position detection circuitry 2 described above can constitute the position detection device 100 illustrated in FIG. 1. The position detection sensor 1A (FIGS. 5A to 5C) or the position detection sensor 1B (FIG. 6) may be used instead of the position detection sensor 1. Regardless of which position detection sensor is used, the position indicated by the electronic pen 200 is detected in a way similar to that of the case where a rectangular position detection sensor is used. Specifically, first, the Y-axis direction loop coils are sequentially selected to check the received signal levels (a process of scanning the Y-axis direction loop coils), and then the X-axis direction loop coils are sequentially selected to check the received signal levels (a process of scanning the X-axis direction loop coils). A point of intersection between the Y-axis direction loop coil and the X-axis direction loop coil with the highest received signal level is the position indicated by the electronic pen 200.

When the indicated position is in the vicinity of the outer edge of the circular position detection sensor 1, 1A, or 1B, there is a possibility that the indicated position cannot be accurately identified due to the presence of multiple loop coils. Therefore, for example, a non-volatile memory of the processing controller 28 stores in advance what is generally called a look-up table for accurately detecting the position indicated in the vicinity of the outer edge of the sensor surface of the circular position detection sensor. This look-up table stores and retains the correspondence between the position indicated by the electronic pen 200 in the vicinity of the outer edge of the sensor surface and the voltage value generated in each of multiple loop coils of the X-axis direction loop coil group XG and the Y-axis direction loop coil group YG in the vicinity of the position indicated by the electronic pen 200 at that time.

Then, assume that the position indicated by the electronic pen 200 is detected in the vicinity of the outer edge of the sensor surface. In this case, based on the induction voltages generated in multiple loop coils arranged in the vicinity of the position indicated by the electronic pen 200 at that time, the look-up table stored in the non-volatile memory of the processing controller 28 is referenced to properly identify the indicated position. This makes it possible to properly determine where on the outer edge of the sensor surface the indicated position is. In this way, even when the circular position detection sensor is used, the position indicated by the electronic pen 200 on the position detection sensor can be properly identified.

Needless to say, the look-up table can be used to detect the position indicated by the electronic pen 200 not only in the vicinity of the outer edge of the sensor surface, but also in the areas other than the vicinity of the outer edge. In particular, when the position detection sensor includes the loop coils with two turns as described with reference to FIGS. 5A to 5C, there are many areas where different loop coils overlap each other. For this reason, the look-up table of the processing controller 28 stores and retains the correspondence between various positions indicated by the electronic pen 200 on the sensor surface of the position detection sensor and the voltage values generated in multiple loop coils of the X-axis direction loop coil group XG and the Y-axis direction loop coil group YG in the vicinity of the position indicated by the electronic pen 200 at that time.

By using the look-up table configured in this way, even when the position detection sensor is configured using the loop coils with two turns, the position indicated by the electronic pen 200 can be properly corrected, and the position indicated on the sensor surface of the position detection sensor can be accurately identified. This similarly applies to the case where the position detection sensor is configured using the loop coils with two or more turns. In other words, in order to properly identify the position indicated by the electronic pen 200, the processing controller 28 stores the look-up table in which the indicated position is associated with the voltage value of each loop coil according to the number of turns of the loop coils and the way the loop coils are arranged. In this way, even when the circular position detection sensor is used, the position indicated by the electronic pen 200 can be properly identified.

Example of Configuration of Position Detection Device for Joystick

Figure 7:
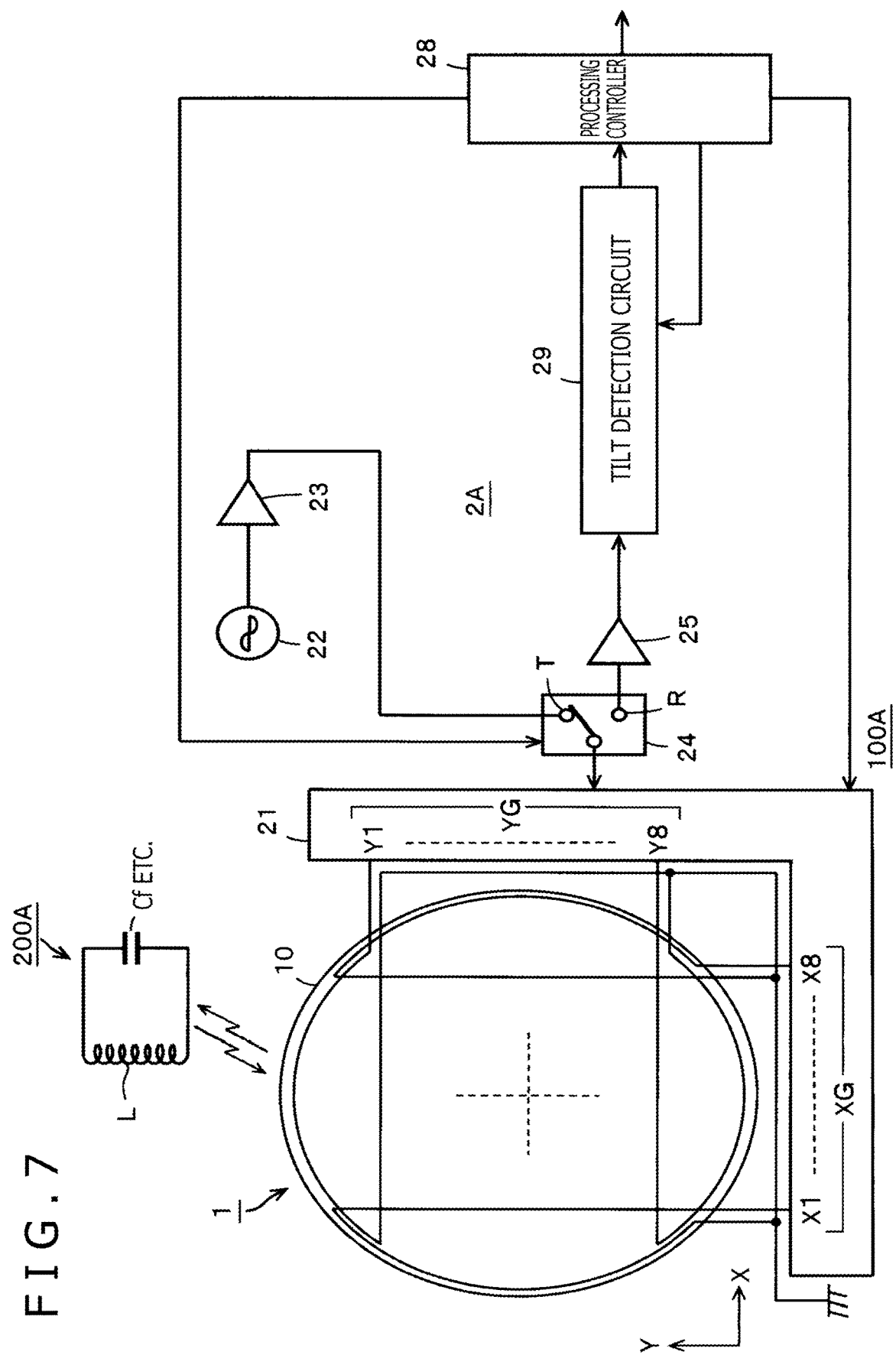
FIG. 7 is a diagram for describing another example of the configuration of the position detection device including the position detection sensor according to the embodiment.

FIG. 7 is a diagram for describing another example of the configuration of the position detection device including the position detection sensor 1 according to the embodiment. This is an example of a configuration of a position detection device 100A for what is generally called a joystick. In the position detection device 100A illustrated in FIG. 7, components configured in a way similar to that of the components of the position detection device 100 illustrated in FIG. 1 are denoted with the same reference symbols, and the description thereof is omitted to avoid redundancy.

A joystick, as widely used in game operation devices, is operated by tilting a stick (lever) at a reference position in various directions, and operation information is input based on the direction and angle of the tilt of the stick (lever). Therefore, in the case of the joystick, it suffices that the stick (lever) implemented by an electronic pen be fixed at the reference position such that the stick can be tilted and operated and the direction and angle of the tilt of the stick can be detected. Therefore, it suffices that an electronic pen 200A, which functions as the stick (lever) of the joystick, include a resonant circuit in which the coil L, the capacitor Cf, and the like are connected to each other in parallel as illustrated in the upper left of FIG. 7. Note that the pen-pressure detector Cv is not included therein.

The position detection device 100A illustrated in FIG. 7 includes the position detection sensor 1 and a position detection circuitry 2A. As can be understood from the comparison between FIG. 7 and FIG. 1, the position detection circuitry 2A does not include the pen-pressure detection circuit 27, but includes a tilt detection circuit 29 instead of the position detection circuit 26. The electronic pen 200A, which functions as the stick (lever) of the joystick, is fixed directly above the center of the circular substrate 10 of the position detection sensor 1 with the pen tip facing the circular substrate 10 such that the electronic pen 200A can be tilted and operated.

As with the position detection device 100 illustrated in FIG. 1, the position detection device 100A according to this example alternately operates in the transmission period and the reception period. That is, the position detection device 100A alternates between the transmission period in which power is sequentially supplied to the plurality of loop coils of the position detection sensor 1 to generate magnetic fields and the reception period in which power supply is stopped and magnetic fields from outside are sequentially received through the plurality of loop coils of the position detection sensor 1.

In the reception period, the tilt detection circuit 29 detects the induction voltage generated in each loop coil of the position detection sensor 1, that is, the received signal, converts the detected output signal into a digital signal, and outputs the digital signal to the processing controller 28. The processing controller 28 calculates the direction and angle of the tilt of the electronic pen 200A, based on the digital signals from the tilt detection circuit 29, that is, the levels of the voltage values of the induction voltages generated in the individual loop coils.

Specifically, larger induction voltages are generated in the loop coils in the vicinity of the pen tip of the electronic pen 200A. Further, if the angle at which the electronic pen 200A is tilted is small, the range of the loop coils where the induction voltages are generated in response to the magnetic signals from the electronic pen 200A is narrow. If the angle at which the electronic pen 200A is tilted is large, the range of the loop coils where the induction voltages are generated in response to the magnetic signals from the electronic pen 200A is wide. Therefore, the direction in which the electronic pen 200A is tilted can be identified based on the positions of the loop coils where the induction voltages are high, and the angle at which the electronic pen 200A is tilted can be identified based on the range of the loop coils where the induction voltages are generated.

The position detection sensor 1 can be used in this way to configure the position detection device 100A suitable for joystick use, in which the electronic pen 200A is operated as the stick (lever). The position detection sensor is not limited to the position detection sensor 1 described with reference to FIGS. 2A to 3 and may be the position detection sensor 1A including the loop coils with two turns as described with reference to FIGS. 5A to 5C. Alternatively, a circular position detection sensor including loop coils with three or more turns configured in a way similar to that of the position detection sensor 1A described with reference to FIGS. 5A to 5C may be used.

Advantageous Effects of Embodiment

The position detection sensors 1, 1A, and 1B according to the embodiment described above can realize circular position detection sensors that have not been available before. Unlike a rectangular position detection sensor, the circular position detection sensors 1, 1A, and 1B do not have four corners. Therefore, they can be incorporated in a space-saving manner. Moreover, even when a circular display device is used, any of the circular position detection sensors 1, 1A, and 1B can be formed so as to correspond to the shape of the circular display device. In other words, any of the circular position detection sensors 1, 1A, and 1B can form a sensor area that corresponds to the shape of the circular display device without a wasteful sensor area. Further, any of the circular position detection sensors 1, 1A, and 1B and the position detection circuitry 2A can be used to implement the position detection device 100A suitable for what is generally called a joystick.

Modifications

In the position detection sensors 1, 1A, and 1B according to the embodiments described above, the circumferential portions of the loop coils X1 to X8 and Y1 to Y8 are curved along the outer edge of the circular substrate 10 or 20. This is because it is desirable that the circumferential portions be disposed along the outer edge of the circular substrate 10 or 20 as much as possible. However, the circumferential portions are not limited to being curved. The circumferential portions of the loop coils may be configured with a combination of multiple straight lines. Further, the circumferential portions such as the circumferential portions E1 and E2 illustrated in FIG. 2C and the circumferential portions E3 and E4 illustrated in FIG. 5C are relatively short in length. Such circumferential portions may be configured with, for example, single straight lines.

Any of the position detection sensors 1, 1A, and 1B can be configured as what is generally called a flexible printed circuit (FPC), so that the position detection sensor can be easily mounted in various apparatuses. To configure the position detection sensor as the FPC, the circular substrate 10 or 20 is formed by a thin insulator (base film), and the loop coils are arranged thereon. The FPC is flexible and can be repeatedly deformed with a weak force. Further, the FPC is capable of maintaining its electrical characteristics even when it is deformed.

In the description above, when the loop coils with two or more turns are used, the straight portions of each loop coil are, for example, arranged at predetermined intervals as illustrated in FIGS. 5A to 5C. However, the embodiment is not limited thereto, and some of the straight portions of each loop coil may be arranged so as to be close to each other. With this configuration, even when the loop coils with two or more turns are used, the loop coils can be arranged in the way described with reference to FIGS. 2A to 3. In this case, it is possible to transmit a stronger magnetic signal and increase the level of a magnetic signal to be received, for example.

In short, it suffices that each loop coil include at least one straight portion and at least one circumferential portion and these loop coils be arranged so as to form the circular sensor surface. In other words, it suffices that each loop coil include at least one straight portion and at least one circumferential portion and each circumferential portion be disposed along at least part of the arc of the outer edge (outer circumference) of the circular substrate.

When the loop coils with multiple turns are used and the straight portions of each loop coil are arranged at predetermined intervals, an area where a magnetic signal transmitted from the electronic pen can be received with high accuracy is wide. Further, while the circular substrates 10 and 20 have been described as true circles in the embodiment described above, the circular substrates 10 and 20 do not necessarily need to be true circles. It is also possible to configure an oval or semicircular position detection sensor.

Although various embodiments of the present disclosure have been described above, the present disclosure is by no means limited to the above-described embodiments. As a matter of course, the various embodiments can be implemented in various modes without departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detection sensor of an electromagnetic induction type connected to a position detection circuitry, comprising:
   a circular substrate;
   a plurality of first loop coils arranged in a first direction on the circular substrate; and
   a plurality of second loop coils arranged in a second direction on the circular substrate, the second direction intersecting the first direction,
   wherein at least some of the plurality of first loop coils each includes a straight portion extending in the second direction and a circumferential portion extending along an outer edge of the circular substrate, and
   at least some of the plurality of second loop coils each includes a straight portion extending in the first direction and a circumferential portion extending along the outer edge of the circular substrate.

2. The position detection sensor according to claim 1, wherein, among the plurality of first loop coils,
   two first loop coils, which are positioned at opposite sides of the circular substrate, each includes the straight portion and the circumferential portion having an arc shape, and
   at least one or more of other first loop coils, which are positioned between the two first loop coils, includes a plurality of the straight portions opposed to each other and a plurality of the circumferential portions opposed to each other.

3. The position detection sensor according to claim 1,
   wherein at least some of the plurality of first loop coils each has a plurality of turns,
   the plurality of first loop coils include two first end loop coils arranged at opposite sides of the circular substrate, and other first loop coils arranged between the two first end loop coils, each of the two first end loop coils having the plurality of turns includes a plurality of the straight portions and a plurality of the circumferential portions, each having an arc shape and extending along the outer edge of the circular substrate, the plurality of the straight portions of different turns of each of the two first end loop coils are arranged at determined intervals in the first direction, the plurality of the circumferential portions of the different turns of each of the two first end loop coils are arranged so as to be close to each other, at least one or more of the other first loop coils includes a plurality of the straight portions opposed to each other and a plurality of the circumferential portions opposed to each other, and the plurality of straight portions of different turns of each of the other first loop coils are arranged at determined intervals in the first direction.

4. The position detection sensor according to claim 1, wherein, among the plurality of second loop coils, two second loop coils, which are positioned at opposite sides of the circular substrate, each includes the straight portion and the circumferential portion having an arc shape, and at least one or more of other second loop coils, which are positioned between the two second loop coils, includes a plurality of the straight portions opposed to each other and a plurality of the circumferential portions opposed to each other.

5. The position detection sensor according to claim 1, wherein at least some of the plurality of second loop coils each has a plurality of turns, the plurality of second loop coils include two second end loop coils arranged at opposite sides of the circular substrate, and other second loop coils arranged between the two second end loop coils, each of the two second end loop coils having the plurality of turns includes a plurality of the straight portions and a plurality of the circumferential portions, each having an arc shape and extending along the outer edge of the circular substrate, the plurality of the straight portions of different turns of each of the two second end loop coils are arranged at determined intervals in the second direction, the plurality of the circumferential portions of the different turns of each of the two second end loop coils are arranged so as to be close to each other, at least one or more of the other second loop coils includes a plurality of the straight portions opposed to each other and a plurality of the circumferential portions opposed to each other, and the plurality of straight portions of different turns of each of the other second loop coils are arranged at determined intervals in the second direction.

6. The position detection sensor according to claim 1, wherein the plurality of first loop coils and the plurality of second loop coils are arranged on different surfaces of the circular substrate.

7. The position detection sensor according to claim 1, wherein each of the plurality of first and second loop coils includes a sensor portion disposed on the circular substrate and a routing portion routed from the circular substrate and connected to the position detection circuitry.

8. The position detection sensor according to claim 1, wherein the circular substrate, the plurality of first loop coils, and the plurality of second loop coils are configured as a flexible printed circuit.

9. The position detection sensor according to claim 1, further comprising:

one or more outermost loop coils with one or more turns that are arranged on an outer side of the plurality of first and second loop coils arranged on the circular substrate and that are extending along the outer edge of the circular substrate.

10. The position detection sensor according to claim 1, further comprising:

one or more outermost loop coils with one or more turns that are arranged on an outer side of the plurality of first and second loop coils arranged on the circular substrate and that are extending along the outer edge of the circular substrate, wherein the one or more outermost loop coils are used to check whether or not an electronic pen is present on an inner side of the one or more outermost loop coils.

11. The position detection sensor according to claim 1, further comprising:

one or more outermost loop coils with one or more turns that are arranged on an outer side of the plurality of first and second loop coils arranged on the circular substrate and that are extending along the outer edge of the circular substrate, wherein the one or more outermost loop coils are configured to transmit magnetic signals, and the plurality of first loop coils and the plurality of second loop coils are configured to receive magnetic signals.

12. The position detection sensor according to claim 1, wherein at least one of the plurality of first loop coils includes plural straight portions, and at least one of the plurality of second loop coils includes plural straight portions.

13. A position detection device of an electromagnetic induction type, comprising:

a position detection sensor; and a position detection circuitry, wherein the position detection sensor includes a circular substrate, a plurality of first loop coils arranged in a first direction on the circular substrate, and a plurality of second loop coils arranged in a second direction on the circular substrate, the second direction intersecting the first direction, wherein at least some of the plurality of first loop coils each includes a straight portion extending in the second direction and a circumferential portion extending along an outer edge of the circular substrate, and at least some of the plurality of second loop coils each includes a straight portion extending in the first direction and a circumferential portion extending along the outer edge of the circular substrate, and the position detection circuitry includes a signal supply circuit configured to sequentially supply signals to the plurality of first loop coils and the plurality of second loop coils in a transmission period, and a tilt detection circuit configured to sequentially receive signals from the plurality of first loop coils and the plurality of second loop coils in a reception period, and detect a direction and an angle of a tilt of a position indicator.

14. The position detection device according to claim 13, wherein
at least one of the plurality of first loop coils includes plural straight portions, and
at least one of the plurality of second loop coils includes plural straight portions.

15. A position detection device of an electromagnetic induction type, comprising:
a position detection sensor; and
a position detection circuitry,
wherein the position detection sensor includes
a circular substrate,
a plurality of first loop coils arranged in a first direction on the circular substrate,
a plurality of second loop coils arranged in a second direction on the circular substrate, the second direction intersecting the first direction, and
one or more outermost loop coils with one or more turns that are arranged on an outer side of the plurality of first and second loop coils arranged on the circular substrate and that are extending along an outer edge of the circular substrate,
wherein at least some of the plurality of first loop coils each includes a straight portion extending in the second direction and a circumferential portion extending along the outer edge of the circular substrate, and
at least some of the plurality of second loop coils each includes a straight portion extending in the first direction and a circumferential portion extending along the outer edge of the circular substrate, and
the position detection circuitry includes
a first signal supply circuit configured to supply signals to the one or more outermost loop coils in a transmission period,
a first position detection circuit configured to receive signals from the one or more outermost loop coils in a reception period, and detect whether or not a position indicator is present,
a second signal supply circuit configured to sequentially supply signals to the plurality of first loop coils and the plurality of second loop coils in the transmission period in response to the presence of the position indicator being detected by the first position detection circuit, and
a second position detection circuit configured to sequentially receive signals from the plurality of first loop coils and the plurality of second loop coils in the reception period, and detect a direction and an angle of a tilt of the position indicator in response to the presence of the position indicator being detected by the first position detection circuit.

16. The position detection sensor according to claim 15, wherein
at least one of the plurality of first loop coils includes plural straight portions, and
at least one of the plurality of second loop coils includes plural straight portions.

* * * * *